United States Patent [19]
Green

[11] Patent Number: 5,531,285
[45] Date of Patent: Jul. 2, 1996

[54] VEHICLE COOLING SYSTEM

[75] Inventor: Ross M. Green, Cambridge, United Kingdom

[73] Assignee: Wavedriver Limited, Melbourn Royston, United Kingdom

[21] Appl. No.: 182,100

[22] Filed: Jan. 28, 1994

[30] Foreign Application Priority Data

Aug. 1, 1991 [GB] United Kingdom .................. 9116661

[51] Int. Cl.$^6$ .............................. B60K 6/02; B60K 11/02
[52] U.S. Cl. ...................... 180/65.2; 180/69.6; 180/165; 123/142.5 E; 165/41
[58] Field of Search ................... 180/65.2, 69.6, 180/165; 60/300; 123/142.5 R, 142.5 E; 165/41

[56] References Cited

U.S. PATENT DOCUMENTS

| | | | |
|---|---|---|---|
| 4,217,864 | 8/1980 | Theodore | 123/142.5 R X |
| 4,249,491 | 2/1981 | Stein | 123/142.5 E X |
| 4,370,956 | 2/1983 | Moser et al. | 123/142.5 R X |
| 4,427,150 | 1/1984 | Van Basshuysen et al. | 123/142.5 E X |
| 4,445,469 | 5/1984 | Suhayda | 123/142.5 R |
| 4,489,242 | 12/1984 | Worst | 123/142.5 E X |
| 4,532,894 | 8/1985 | Wulf et al. | |
| 4,732,229 | 3/1988 | Lucht | 180/69.6 |
| 5,251,588 | 10/1993 | Tsujii et al. | 123/142.5 E X |
| 5,291,960 | 3/1994 | Brandenburg et al. | 180/65.2 |
| 5,323,868 | 6/1994 | Kawashima | 123/142.5 E X |

FOREIGN PATENT DOCUMENTS 5119515  9/1980  Japan .

OTHER PUBLICATIONS

Automotive Industries, News: Ford's 1st Electric Car, pp. 19–21, Jul. 1, 1967.

Primary Examiner—Brian L. Johnson
Attorney, Agent, or Firm—Watson Cole Stevens Davis

[57] ABSTRACT

An electric-hybrid type vehicle, has a main electric drive and motor and an auxiliary internal combustion engine drive. The vehicle includes an integrated liquid cooling/heating system for the electric drive power supply and the motor and the auxiliary internal combustion engine, whereby heat removed from the electric drive power supply can be supplied to the auxiliary internal combustion engine to pre-heat it. A space heater may also be provided and supplied with heat from the drive power supply and from the traction motor.

6 Claims, 3 Drawing Sheets

VEHICLE COOLING SYSTEM

BACKGROUND OF THE INVENTION

The present invention relates to cooling systems in hybrid vehicles of the so-called "electric-hybrid" (EH) type, namely of the type having a main electric drive and an auxiliary internal combustion engine (AICE) drive.

Environmental issues have heightened the interest in recent years in alternative means for providing personal and commercial transportation. Economic and regulatory issues have combined to promote the view that electric powered vehicles will, over the next ten years, appear in significant numbers. It is possible that the number of electric or electric-hybrid (EH) vehicles in key areas may be around 100,000 or more by the year 2000.

Aside from the known modest performance levels of electric and hybrid vehicles, a major issue is that of cost. Presently, EH vehicles with performance levels acceptable to personal users are expected to sell from 2 to 2.5 times the price of functionally comparable conventional vehicles. This cost differential is in part due to the cost of the batteries needed, but is also due to the many support systems needed in an electric vehicle. The support systems problem is even more severe in an EH vehicle.

Such support systems include vehicle heating. Conventional vehicles provide interior heating by utilising waste heat from the internal combustion engine cooling system. This is not available in electric vehicles, or in hybrid low emission vehicles which operate for much of the time in electric-only mode. Electric vehicles typically provide the 1 to 2kW of heat required directly from the traction battery. Consequently, one hour of heating may absorb 1kW-hr or more. This energy level is significant in comparison with the battery energy storage capability of 15 to 25kW-hr typical for personal electric and EH vehicles.

Aside from the subject of vehicle support systems, a specific problem arises with EH vehicles which use auxiliary internal combustion engines. To minimise exhaust emissions, the operating strategy of these vehicles is structured to run the internal combustion engine as little as possible, and to operate the internal combustion engine at points of best emissions, when it is running. These best emission points are typically at close to the maximum engine output. Consequently, the internal combustion engine is started and stopped frequently.

Following start, a period of typically two minutes or longer will be required before the internal combustion engine reaches operating temperature and can reliably accept high loads. During this "warm-up" period the engine emissions are high. Indeed, emissions during the warm up period account for a significant proportion of all vehicle emissions.

Conventional EH vehicles use a so-called "series hybrid" approach in which the auxiliary internal combustion engine is connected to a dedicated generator and is not used directly to drive the vehicle. An alternative approach, the "parallel hybrid" has both parts of the drive mechanically connected to the driving wheels. This has some advantages, particularly the ability to supply considerably more power than the electric drive alone and the elimination of the separate, expensive generator. Where the vehicle motional power demands are below the maximum output of the AICE, the AICE is run at a high output level (preferably a point of minimum emissions) and the electric traction drive is operated as a brake. The excess AICE output, over the vehicle motional demands, is then regenerated to the batteries via the traction drive.

However, a weakness of such "parallel" systems is the vehicle performance over extended periods of slow speed operation; for example, crawling in congested traffic conditions. Clearly, this mode of operation is important in a vehicle intended for use in major conurbations, such as Los Angeles. Under these conditions the AICE cannot be used to charge the batteries as the driveline speed is for the most part below the minimum running speed of the AICE, and the AICE must be disengaged. Complete depletion of the batteries then becomes possible, regardless of the amount of fuel available for the AICE.

The traction system of an EH vehicle may utilize well-known pulse-width modulation (PWM) inverter methods to synthesize a closely-controlled AC supply, from the DC traction battery. The controlled AC supply is used to drive conventional induction, permanent magnet synchronous or other motors under variable speed and torque regimes to meet the demands of the vehicle user. A major advantage is the brushless nature of the motor, which has markedly lower cost—and higher environmental tolerance—than the brushed DC motors normally used for controllable drives.

Since 1985, drive systems of the AC type have come into more general use. An industrial inverter drive normally operates by first converting the normal three phase or single phase line supply to an intermediate DC voltage, prior to "inverting" the DC back to AC with the desired parameters for driving the target motor. This intermediate rectification process complicates the drive, adding to cost, and has played a part in slowing the spread of AC inverter drives for industrial applications. An AC drive is, however, well suited to vehicle traction applications where the primary energy source is DC batteries. Vehicle applications of AC systems are still in the minority compared to conventional DC brushed traction systems, primarily due to the sophistication of the control systems necessary to achieve satisfactory operation with the AC system—and the costs of such systems when conventional methods are used.

The inverter proposed for use in the present system is based on insulated-gate bipolar transistors, operating under the control of a microcomputer. Many other device technologies are also applicable, and other control methods aside from PWM can also be used. An example is the Load Commutated Inversion method, relying on natural commutation of the inverter devices, which is particularly applicable with permanent magnet machines.

Such an inverter has an energy efficiency of approximately 96% at full load, so that when 50kW are being delivered to the traction motor or motors, 2kW is dissipated in the inverter. At lower power levels, the losses are not as substantial. However, it is rare for the losses to be lower than 1kW. It is normal in vehicle drive systems to use air cooled thermal radiators or heatsinks to directly dissipate this heat to the ambient air.

SUMMARY OF THE INVENTION

According to a first aspect of the present invention, an "electric-hybrid" (EH) type vehicle, having a main electric drive and an auxiliary internal combustion engine (AICE) drive, includes an integrated liquid cooling/heating system for the electric drive power supply and the auxiliary internal combustion engine (AICE), whereby heat removed from the electric drive power supply can be supplied to the auxiliary internal combustion engine to pre-heat it.

Heat may also or alternatively be provided to an internal (domestic) space heater for heating the interior of the vehicle when required.

A conventional radiator may also be provided in order to dispose of excess heat.

Thus, in the present system, liquid cooling of the inverter drive heat sinks is adopted rather than air cooling, having a number of benefits. For example, firstly, it permits the space required for the inverter to be greatly reduced in comparison to a directly air-cooled system. Secondly, the space occupied by auxiliary cooling equipment such as fans etc. is freed for other uses. Thirdly, by integrating the inverter (power supply) cooling system with the cooling system (and radiator) of the auxiliary internal combustion engine (AICE), the AICE can be preheated by the inverter losses to a temperature high enough that almost instantaneous power delivery, at normal emission levels, is possible.

Further integration is also possible, with the cooling system being arranged to provide internal domestic vehicle heating. To achieve this, coolant from the inverter heatsinks can be reticulated through conventional vehicle heaters, to heat the interior of the vehicle in the normal way, with standard components. Use of this heat for heating the interior of the vehicle reduces the required rating of the auxiliary converter which would otherwise be needed to supply electrical heating energy, thus further reducing space and weight and resulting in lower costs. Furthermore, reducing the rating of the auxiliary converter results in lower cooling requirements.

The integrated cooling/heating system includes appropriate sensors and control valves to enable heat generated in the system to be supplied as required by the vehicle's systems, in dependence on the instant operating conditions and passenger requirements.

The use of a liquid cooling system will also provide an absorption medium for the noise created by the AICE and, to a lesser extent, the electric drive train.

Most EH vehicles will not operate without some electrical traction power present, so that in almost all operational scenarios the inverter will be operational and significant preheating will be possible. This means that, as the AICE will be ready for operation immediately, and it will start easily, it can be run in total for shorter lengths of time, reducing emissions still further.

When the AICE is running at high loads, the exit coolant temperature from the AICE radiator will be at temperatures of 110° C. or so. These temperatures are too high for use with the inverter cooling system, so that inverter coolant must be diverted from the AICE system under these conditions, to a separate small radiator. It may be possible in some systems to restrict the output of the inverter during periods of high AICE loads, however, so that this separate radiator is not needed.

Where liquid cooled electric traction motor(s) are being used, still further integration can be achieved, the heat recovered from the traction motor(s) also being used for vehicle domestic heating and AICE preheating.

According to a second aspect of the invention, an "electric-hybrid" (EH) type vehicle, having a main electric traction motor and an auxiliary internal combustion engine (AICE) drive, includes an integrated liquid cooling/heating system connecting the electric traction motor and the AICE, whereby heat removed from the electric traction motor can be supplied to the AICE to pre-heat it.

Coolant temperatures exceeding 100° C. are typical with traction motors, so that full integration with the AICE system is possible. A typical traction motor will show an efficiency (operating from a 300V DC supply) of approximately 88%, so that some 5kW is available from this source in a 50kW traction system. When the motor is operating under the more normal part-load conditions, for example at 15kW, 1kW to 2kW of heat is still available from this source.

In the inverter proposed for the present system, the heatsink dimensions are approximately 250mm by 175mm by 30mm, as compared to 450mm by 400mm by 150mm or larger for an equivalent air cooled system. The dimensions of the inverter have been fixed primarily for constructional convenience; much smaller dimensions are possible.

Coolant (water cooling is acceptable) is reticulated through the heatsinks at rates typically in the region of 5 to 10 liters per minute. The flow rate depends on the exit fluid temperature desired. In this system, exit water temperature can be up to 90° C.

BRIEF DESCRIPTION OF THE DRAWINGS

One example of a vehicle cooling system according to the present invention will now be described with reference to the accompanying drawings, in which.

DESCRIPTION OF THE INVENTION

Figure 1:
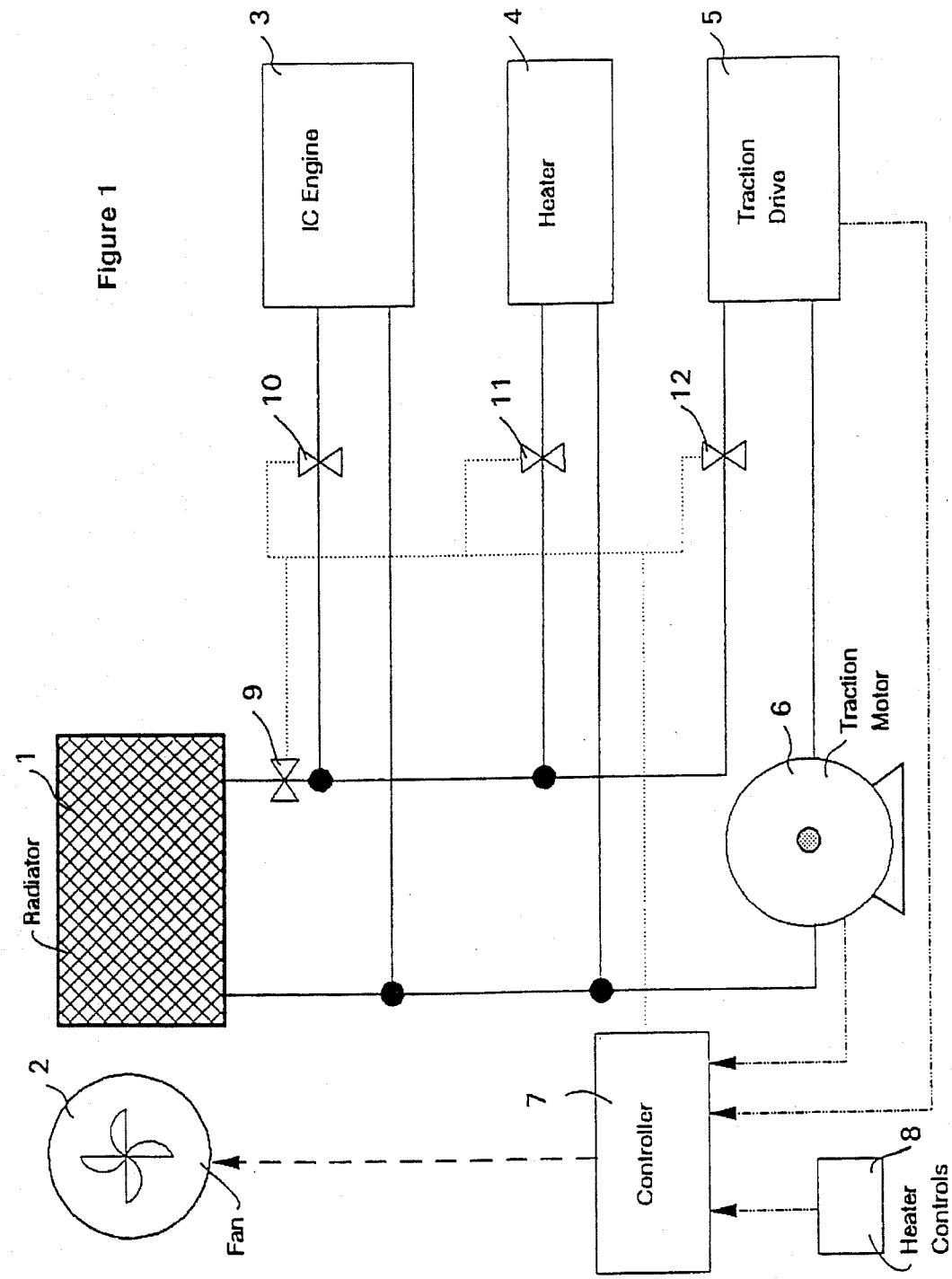
FIG. 1 is a conceptual fluid flow diagram for the vehicle.

In FIG. 1 there is shown a vehicle cooling/heating system having a radiator 1 and associated fan 2, together with an auxiliary internal combustion engine (AICE) 3 and a domestic (internal) heater 4, the radiator and engine cooling/heating system thus far being substantially conventional. The heating/cooling system, however, includes a number of additional components, namely an electric traction drive 5, preferably in the form of an inverter drive, and an electric traction motor 6. A controller 7, with heater controls 8, is provided for control of the cooling/heating system.

As the normal mode of operation of a hybrid vehicle is intended to be by way of the inverter drive 5 and electric traction motor 6, it will normally be necessary to cool the inverter 5 and motor 6, so the fluid circuit shown in FIG. 1 illustrates the radiator 1, traction drive 5 and motor 6 as being in series in a cooling loop. It will be appreciated, however, that, depending on the particular vehicle, the traction drive 5 and motor 6 may be in parallel with one another.

Solenoid flow control valves 9–12 are provided to control the flow of coolant, under the central control of the controller 7, to/from the AICE 3, heater 4, traction drive 5 and motor 6, and the radiator 2. Sensors, not shown, feed information to the controller 7 which then determines the most suitable operation/actuation of the valves 9–12 in order to achieve optimum conditions, depending on the operational conditions of the vehicle and the ambient temperature.

Figure 2:
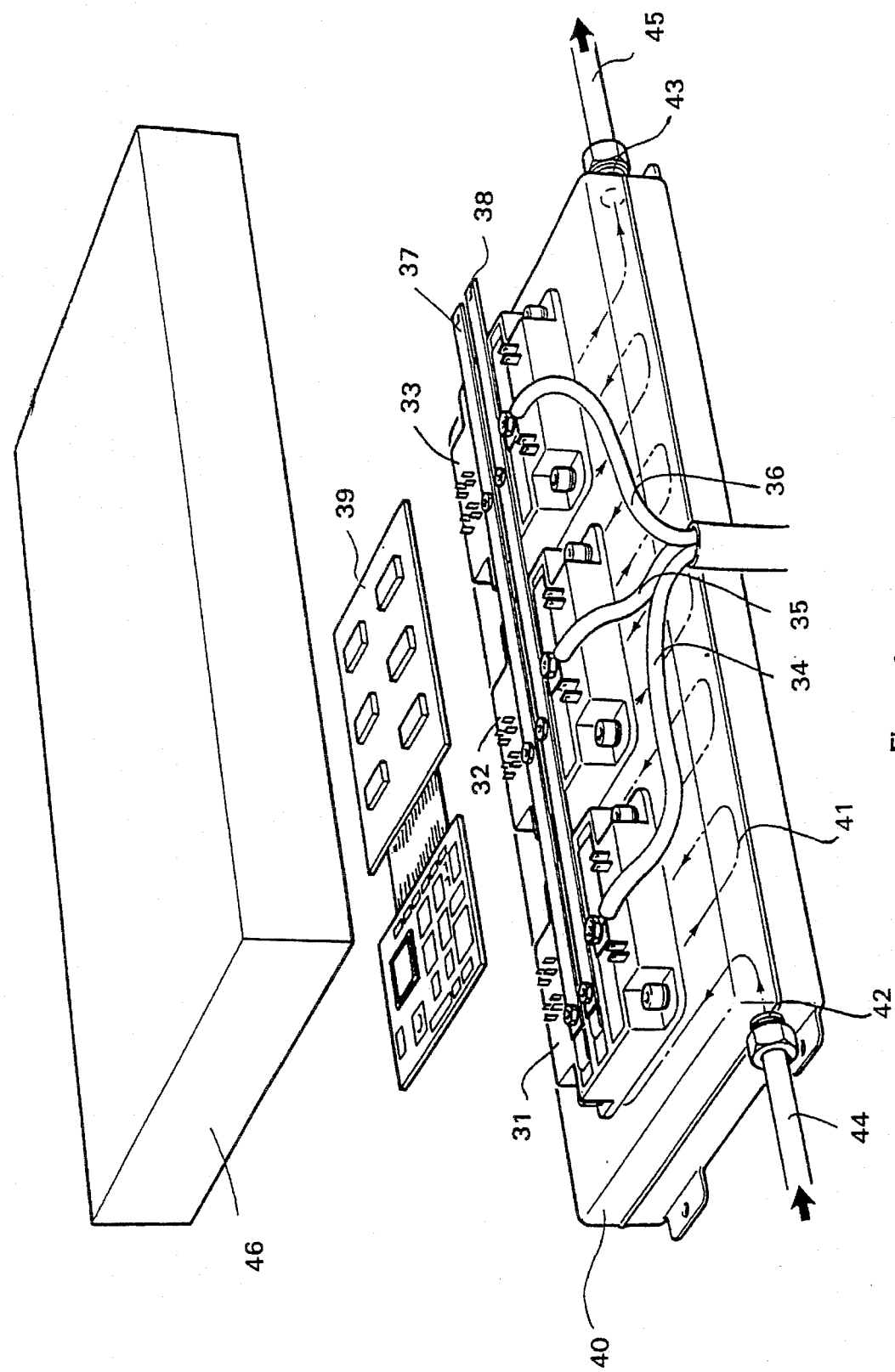
FIG. 2 illustrates the liquid cooling of the inverter.

FIG. 2 illustrates, in an exploded isometric view, one possible configuration for the cooling of the traction drive or inverter 5. The small size of this may be contrasted with that of the conventional inverter cooling system shown, to the same scale, in FIG. 3.

The inverter drive 5 shown in FIG. 2 is a three-phase drive, having phases 31,32 & 33 supplying electric drive power to the traction motor 6 (not shown in FIG. 2) through conductors 34,35 & 36 respectively and, in turn, drawing power from the vehicle battery (not shown) through busbars 37,38. The associated drive electronics, which in use are closely coupled to the inverter, are shown at 39, spaced apart from the inverter for the purpose of clarity.

Mounted directly to the underside of the inverter 5 is a heat exchanger 40 with a sinuous channel 41 for coolant and inlet 42 and outlet 43 ports, to which hoses or conduits 44,45 are attached and which lead to other components of the cooling/heating system. A cover 46 is also provided, shown displaced from its normal position for clarity.

Figure 3:
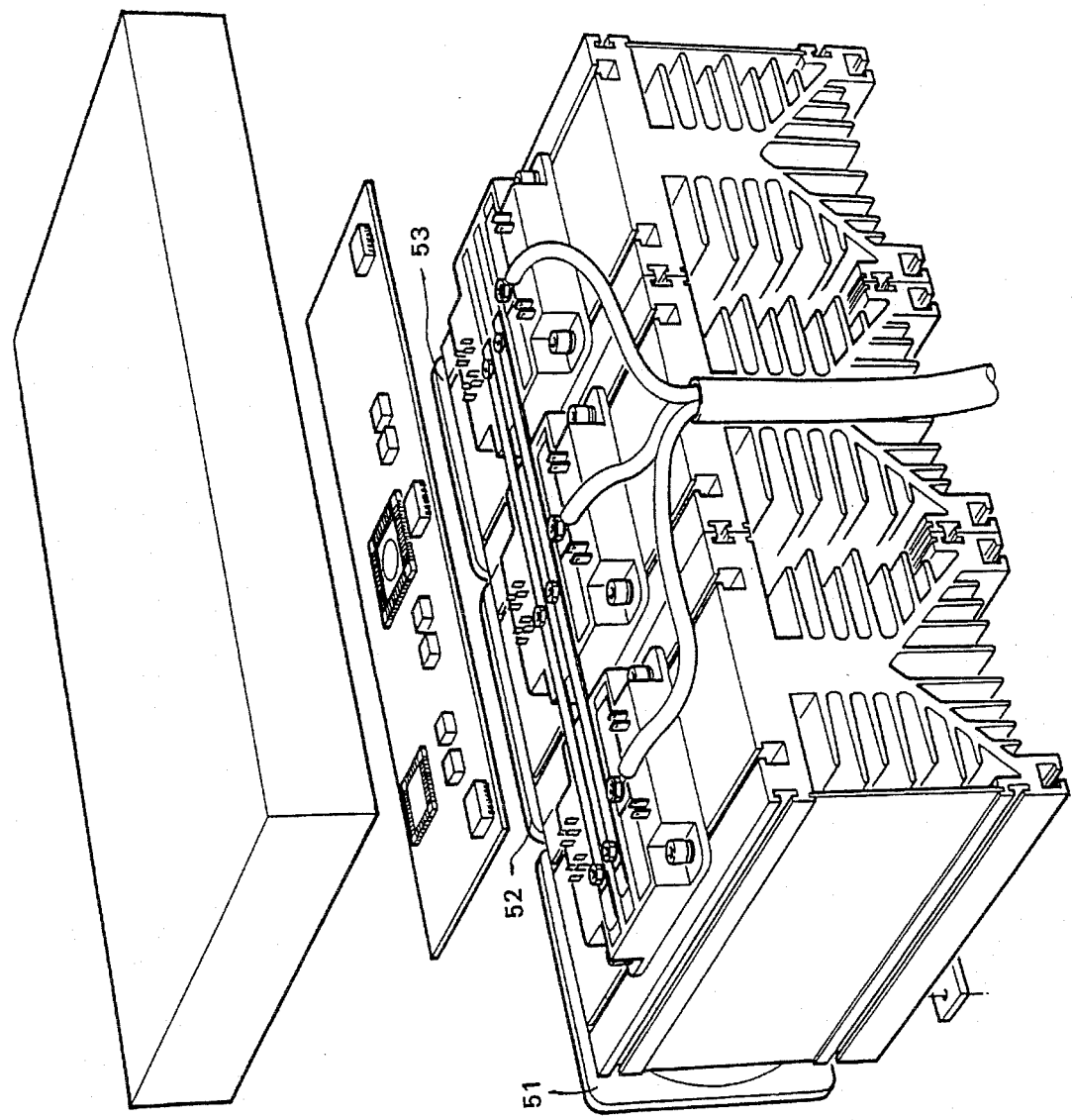
FIG. 3 illustrates conventional, air cooling of an inverter drive.

The small size of the inverter drive shown in FIG. 2 is contrasted with that shown in FIG. 3 which employs air cooling, with heat dissipation through a heat sink through which air may be blown by fans 51–53.

Rather than waste the heat generated, during operation of the vehicle under traction motor operation, by the inverter drive 5 and traction motor 6, the present system utilizes such heat to pre-heat the AICE 3 and/or supply it to the domestic heater 4, but excess heat can be vented by use of the radiator 1.

I claim:

1. An electric-hybrid vehicle, comprising:
   a main electric drive, including an electric motor for driving the vehicle and a power supply therefor;
   an auxiliary internal combustion engine drive for driving the vehicle; and
   an integrated liquid cooling/heating system connecting the electric drive power supply and the auxiliary internal combustion engine, for removing heat from the electric drive power supply, and for supplying the heat removed by said integrated liquid cooling/heating system, to the auxiliary internal combustion engine in order to pre-heat the engine.

2. A vehicle according to claim 1, having an interior, and further including an internal space heater disposed within said interior, connected to said integrated liquid cooling/heating system for removing heat therefrom, and for selectively heating the interior of the vehicle.

3. A vehicle according to claim 1, further comprising a engine radiator connected to said integrated liquid cooling/heating system for receiving excess heat therefrom and for disposing of said excess heat from said integrated liquid cooling/heating system.

4. A vehicle according to claim 1, wherein said auxiliary internal combustion engine drive has a liquid coolant, further comprising a separate radiator; and means within said integrated liquid cooling/heating system for diverting said liquid coolant from the auxiliary internal combustion engine system under conditions of high coolant temperature to said separate radiator for partial cooling of said coolant.

5. A vehicle according to claim 2, wherein said electric motor includes a liquid coolant for removing heat therefrom and the heat removed from the electric motor of said main electric drive being carried by said coolant to the vehicle interior and to the auxiliary internal combustion engine.

6. An electric-hybrid vehicle, having a main electric traction motor and an auxiliary internal combustion engine drive, for driving the vehicle, and including an integrated liquid cooling/heating system connecting the electric traction motor and the auxiliary internal combustion engine for removing heat from the electric traction motor and for selectively supplying said heat removed from the electric traction motor by said integrated liquid cooling/heating system to the auxiliary internal combustion engine in order to pre-heat the engine.

* * * * *

UNITED STATES PATENT AND TRADEMARK OFFICE
CERTIFICATE OF CORRECTION

PATENT NO. : 5,531,285
DATED : July 2, 1996
INVENTOR(S) : Ross M. GREEN

It is certified that error appears in the above-indentified patent and that said Letters Patent is hereby corrected as shown below:

On the cover title page patent please insert the following data:

Item [22]  PCT Filed: August 3, 1992

Item [86]  PCT No.: PCT/GB92/01434
           §371 Date: January 28, 1994
           §102(e) Date: January 28, 1994

Item [87]  PCT Pub. No.: WO 93/02884
           PCT Pub. Date: February 18, 1993

Signed and Sealed this

Eighth Day of October, 1996

Attest:

BRUCE LEHMAN

Attesting Officer    Commissioner of Patents and Trademarks